United States Patent
Barrett et al.

(10) Patent No.: US 6,185,646 B1
(45) Date of Patent: Feb. 6, 2001

(54) METHOD AND APPARATUS FOR TRANSFERRING DATA ON A SYNCHRONOUS MULTI-DROP

(75) Inventors: Wayne Melvin Barrett; Gerald Keith Bartley, both of Rochester; Douglas A. Baska, Oronoco; Paul Eric Dahlen, Rochester; Robert Allen Drehmel, Goodhue; Kenneth Claude Hinz; James Anthony Marcella, both of Rochester, all of MN (US)

(73) Assignee: International Business Machines Corporation, Armonk, NY (US)

( * ) Notice: Under 35 U.S.C. 154(b), the term of this patent shall be extended for 0 days.

(21) Appl. No.: 08/984,611

(22) Filed: Dec. 3, 1997

(51) Int. Cl.[7] .................................................. G06F 13/00
(52) U.S. Cl. ................................... 710/107; 711/150
(58) Field of Search ........................ 711/147, 150, 711/151; 710/100–132; 395/855, 200.67

(56) References Cited

U.S. PATENT DOCUMENTS

| | | | |
|---|---|---|---|
| 4,823,347 | * 4/1989 | Chin et al. ............................ | 371/49 |
| 5,113,514 | * 5/1992 | Albonesi et al. ..................... | 395/425 |
| 5,131,085 | * 7/1992 | Eikill et al. .......................... | 395/325 |
| 5,197,130 | * 3/1993 | Chen et al. .......................... | 395/325 |
| 5,339,404 | * 8/1994 | Vandling, III ....................... | 395/575 |
| 5,388,242 | * 2/1995 | Jewett .................................. | 395/425 |
| 5,640,519 | * 6/1997 | Langendorf et al. ................ | 395/291 |
| 5,754,800 | * 5/1998 | Lentz et al. ......................... | 395/296 |

* cited by examiner

*Primary Examiner*—David A. Wiley
(74) *Attorney, Agent, or Firm*—Joan Pennington

(57) ABSTRACT

A data transfer method and apparatus are provided for transferring data in a computer system on a high-speed synchronous multi-drop bus. Multiple devices including at least a first group of a plurality of devices and a second group of at least one device are connected to the high-speed synchronous multi-drop bus. To transfer data between devices in the first group, a first unidirectional data valid signal is applied to each device in the second group. The data from a sending device in the first group is transferred to a designated device in the second group. A second unidirectional data valid signal is applied to each device in the first group. The data is transferred from the designated device in the second group to a selected device in the first group.

10 Claims, 5 Drawing Sheets

METHOD AND APPARATUS FOR TRANSFERRING DATA ON A SYNCHRONOUS MULTI-DROP

FIELD OF THE INVENTION

The present invention generally relates to computer systems with high-speed synchronous multi-drop busses, and more particularly, relates to a data transfer method and apparatus on a high-speed synchronous multi-drop bus.

DESCRIPTION OF THE RELATED ART

Synchronous multi-drop communication busses are a common element in computer systems today. Multiple devices attach to the bus, allowing any device to communicate with any other device. Each device can initiate transfers on the bus after first having gained permission via an arbitration protocol. As a device obtains ownership of the bus and begins to transfer data, due to the synchronous nature of the bus, the data must be able to propagate successfully to all other devices within each given clock cycle.

Due to the topology, or the physical relationship, of all the devices on this bus, some device-to-device propagation delays are shorter than others. As a result of reflections and other transmission-line effects of the wires, the propagation delays are the largest when a device is communicating with another device that is close in physical proximity. This is called near-end communication; that is, communicating with another device that is nearest. The propagation delays are the shortest when communicating with devices that are the farthest away. In designing a synchronous multi-drop bus, the limiting factor of how fast the clocking rate can be typically is determined by the propagation delay of the near-end communication paths.

A need exists to increase the clocking rate of the bus beyond the limit imposed by the near-end communication paths, but to still allow any-device to any-device communication.

SUMMARY OF THE INVENTION

Important objects of the present invention are to provide a data transfer method and apparatus on a high-speed synchronous multi-drop bus; to provide such method and apparatus substantially without negative effect; and to provide such method and apparatus that overcome many of the disadvantages of prior art arrangements.

In brief, a data transfer method and apparatus are provided for a computer system on a high-speed synchronous multi-drop bus. Multiple devices including at least a first group of a plurality of devices and a second group of at least one device are connected to the high-speed synchronous multi-drop bus. To transfer data between devices in the first group, a first unidirectional data valid signal is applied to each device in the second group. The data from a sending device in the first group is transferred to a designated device in the second group. A second unidirectional data valid signal is applied to each device in the first group. The data is transferred to a selected device in the first group.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
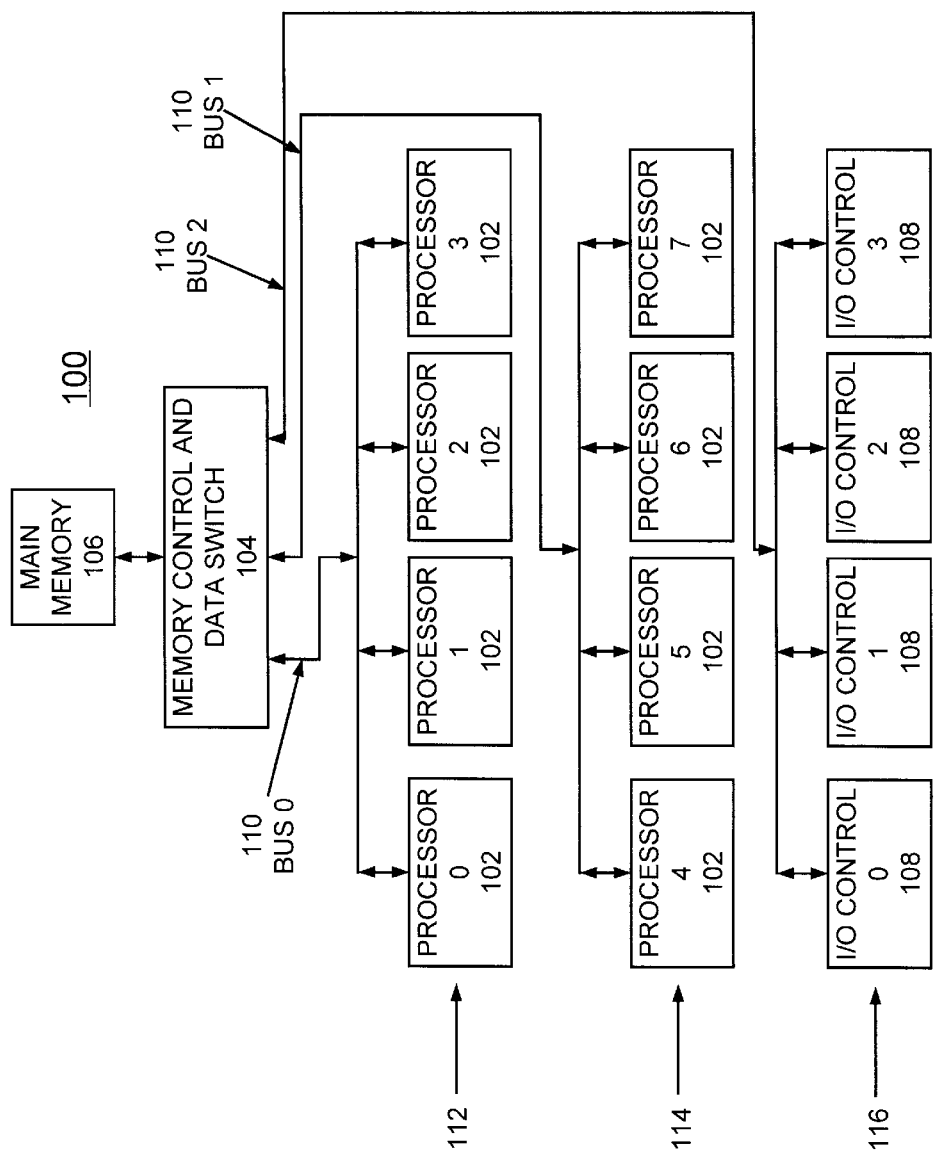
FIG. 1 is a block diagram representation illustrating a computer system for implementing a data transfer method of the preferred embodiment.

Having reference now to the drawings, in FIG. 1 there is shown a block diagram of a data processing or computer system 100 in which a preferred embodiment of the invention is implemented. Computer system 100 includes a plurality of processors (0–7) 102, a memory control and data switch 104, a main memory 106 and a plurality of input/output (I/O) controls 108 (0, 1, 2 and 3). Computer system 100 includes multiple high-speed synchronous multi-drop busses (0, 1 and 2) 110. A first group 112 of processors (0, 1, 2, and 3) 102 is connected by the multi-drop bus (0) 110 to the memory control and data switch 104. A second group 114 of processors (4, 5, 6, and 7) 102 is connected by the multi-drop bus (1) 110 to the memory control and data switch 104. A group 116 of all of the I/O controls 108 is connected by the multi-drop bus (2) 110 to the memory control and data switch 104.

In accordance with an important feature of the preferred embodiment, the bus clock rate is increased beyond that previously possible, while any-device to any-device communication is preserved. The present invention is applicable to multi-drop busses 110 where the following two characteristics exist. Firstly, the devices connected to the multi-drop bus are physically divided into at least two separate groups, such as 104 and 112, 114, or 116. It should be understood that one of the at least two separate groups may only consist of one device. For example, as shown in FIG. 1 the memory control and data switch 104 illustrates one group. Secondly, while communications between all devices is allowed and exists within the system 100, the majority of the communications or data transfers are from a device within one group to a device within another group. This is called inter-group communication. Or in other words, intra-group communications make up a smaller amount of the overall bus traffic in the computer system 100.

In FIG. 1, processors (0, 1, 2, and 3) 102 comprise the first group 112, processors (4, 5, 6, and 7) 102 comprise the second group 114, and I/O controls (0, 1, 2 and 3) 108 comprise the third group 116. The distance between the multiple devices 102 and 108 in each group 112, 114 and 116 is shorter than the distance between each groups 112, 114 and 116 and the memory control and data switch 104.

Figure 2:
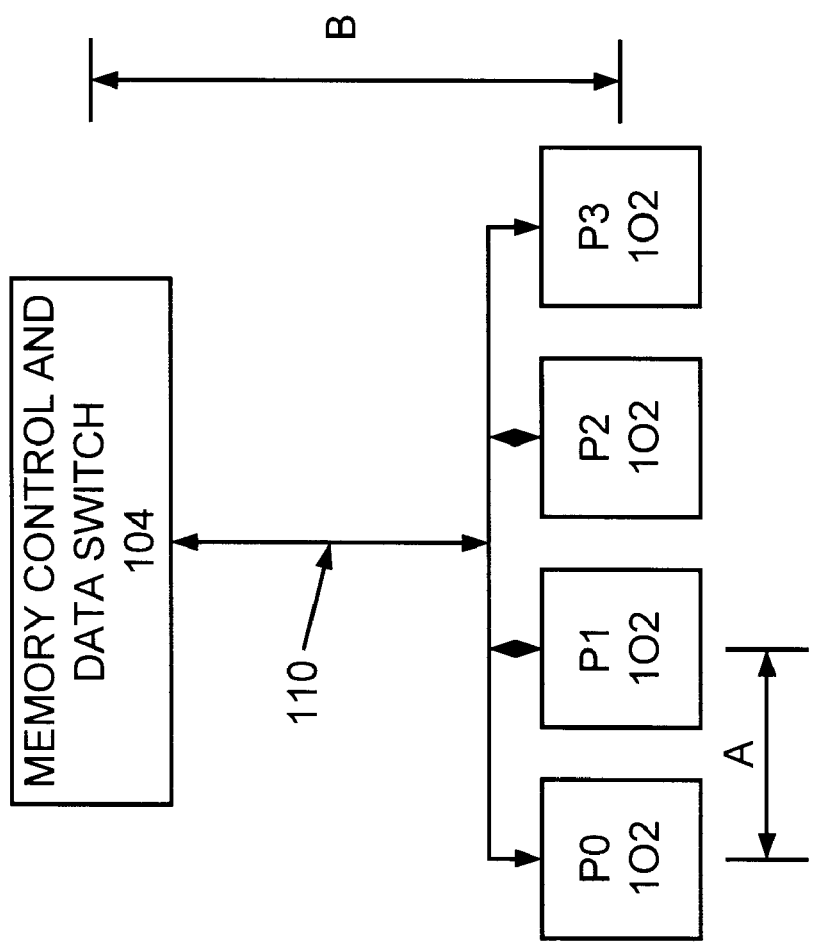
FIGS. 2 and 3 are more detailed diagrams illustrating a high-speed synchronous multi-drop bus of the computer system of FIG. 1.

Referring to FIG. 2, the multi-drop synchronous bus 110 of the system 100 is shown with the first group 112 of processors (0, 1, 2, and 3) 102 and the memory control and data switch 104 to illustrate the spatial relationship between the devices 102 and between groups of devices 102 and 104. A distance indicated by an arrow labeled A between two of the devices 102 in group 112 is less than a distance indicated by an arrow labeled B between the group 112 and the memory control and data switch 104. Intra-group data communications or traffic, for example within the group 112, would have longer propagation delays than inter-group data traffic between groups 104, 112, 114, and 116.

In accordance with the preferred embodiment, the bus clock rate is increased beyond that which is allowed by near-end communication delays, while maintaining a bus clock rate such that inter-group communication is still achievable. Any device can transfer data to another device within the same group, such as the processor P0 102 can transfer data to another processor P1 102 in group 112. The intra-group communication or data transfer between devices in the same group is accomplished by performing the following two steps:

First, the data is sent to a designated device within the opposite group. This is called the ricochet device for that group. For example, the memory control and data switch 104 is the ricochet device for group 112 in FIG. 1.

Second, the ricochet device then gains ownership of the bus 110 and transfers the data back toward the initial group to the intended destination device. Each data transfer is propagated successfully to the other designated device within each given bus clock cycle.

As the devices 102 transfer data at a higher clock rate enabled by the method of the preferred embodiment, the other devices 102 within the same group, for example, group 112, are unable to reliably receive the data. Therefore, another feature of this invention is a valid data signal mechanism arranged such that when a device transfers data, that the other devices within that same group ignore the data.

Multi-drop communication paths within computer systems typically consist of bi-directional tri-state signals to convey address, data, and control information. Among these signals are a few critical control signals such as a data valid signal. The data valid signal alerts the other devices that valid data or other information is present on the bus and should be sampled. To achieve the ricochet data transfer function of the preferred embodiment, the wiring and functioning of the conventional data valid signal is changed.

Figure 3:
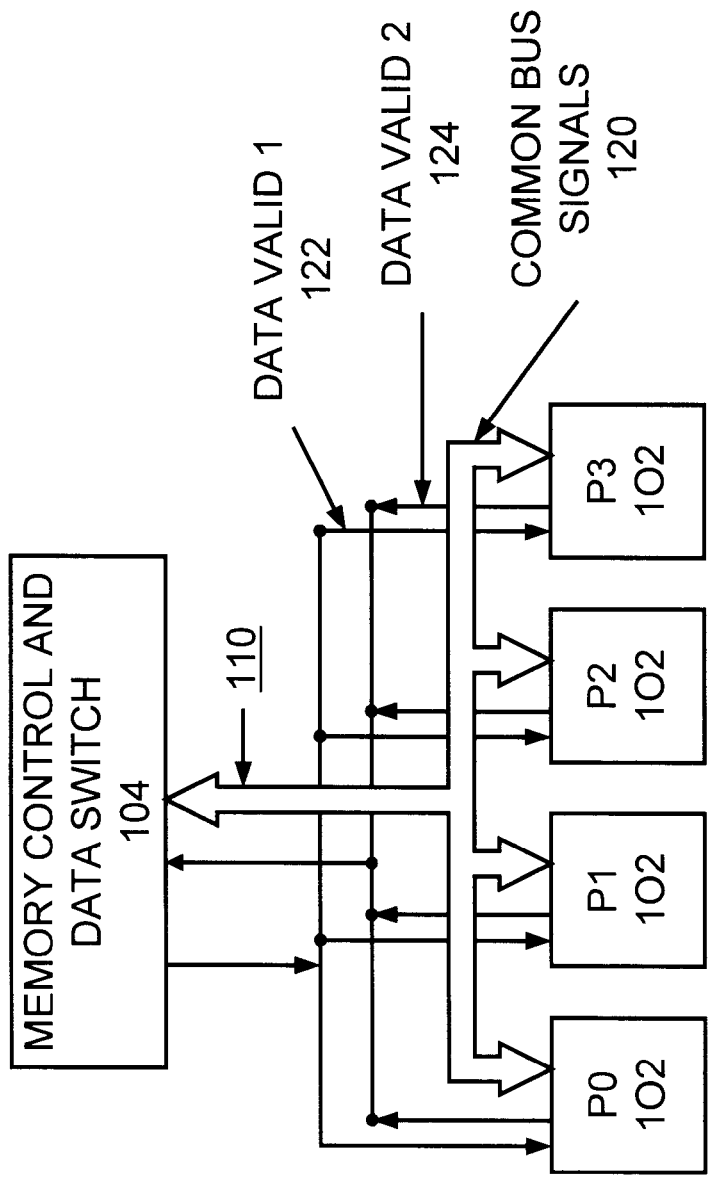

Referring to FIG. 3, computer system 100 include common bus signals 120 to convey address, data, and control information. Instead of having a conventional single, common, bi-directional data valid signal wired to all of the devices 102, a pair of unidirectional data valid signals are utilized as shown at lines labeled DATA VALID 1 122 and DATA VALID 2 124. DATA VALID 2 124 is driven by the devices 102 in group 112, and received by all of the devices in group 2 or the memory control and data switch 104, as shown in FIG. 3. DATA VALID 1 122 is driven by the memory control and data switch 104, or multiple devices in group 2, and received by all of the devices in group 1 or all the devices 102 in group 112, as shown in FIG. 3.

Therefore, when one of the processors 102, for example processor 0 in group 112 transfer data that is intended for another of the processors 102 in group 112, for example processor 1, DATA VALID 2 is driven active. The memory control and data switch 104 recognizes that there is valid data on the bus 110, but other processors 102 in group 112 are unaware that a transfer is taking place.

Figure 4:
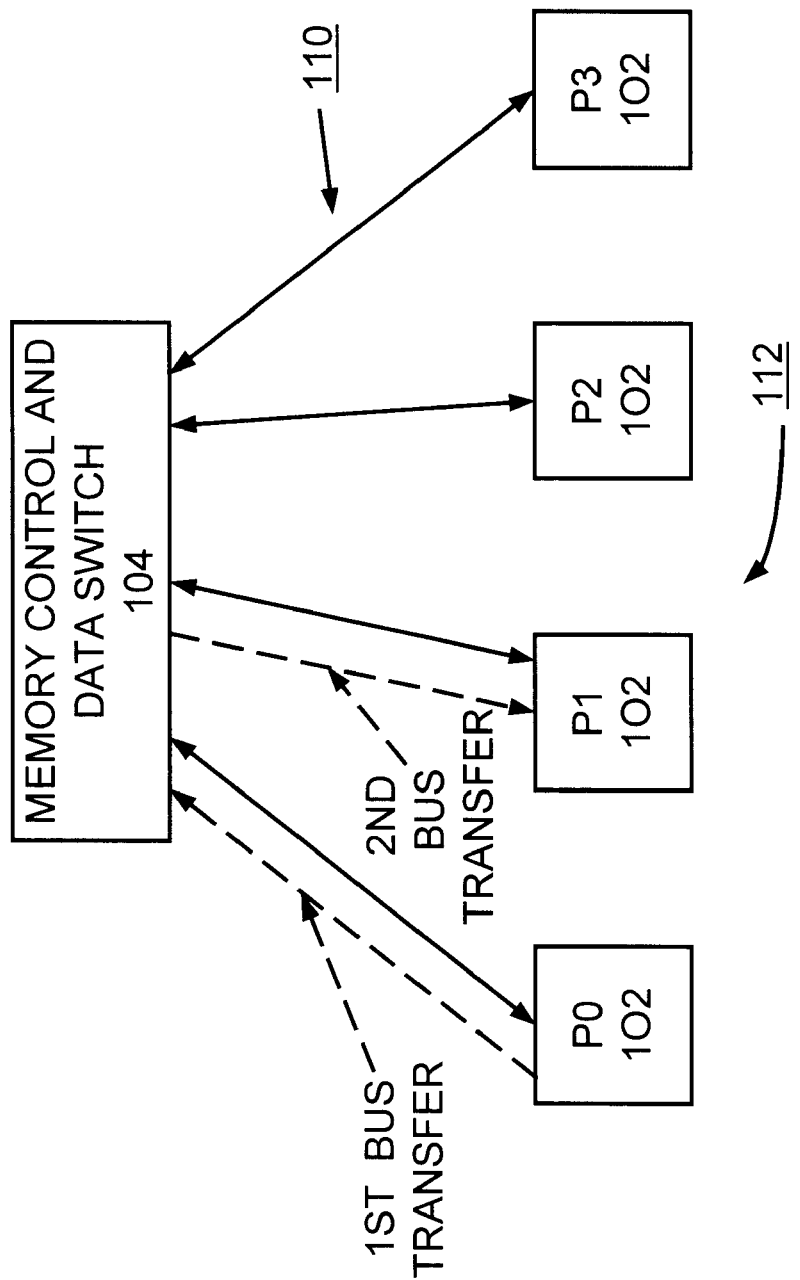
FIG. 4 illustrates a logical view of the high-speed synchronous multi-drop bus of the computer system of FIG. 1.
Figure 5:
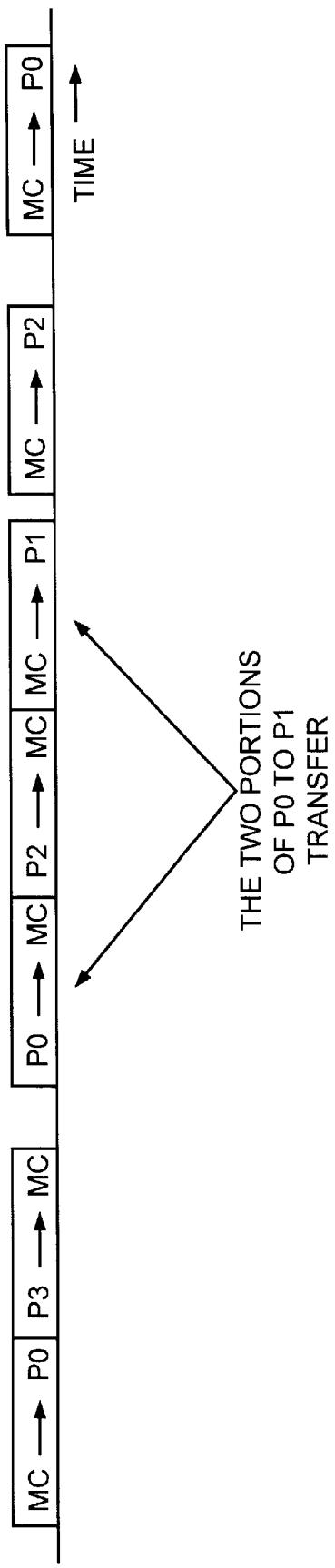
FIG. 5 illustrates an exemplary traffic flow on the high-speed synchronous multi-drop bus of the computer system of FIG. 1.

Having reference to FIGS. 4 and 5, with a faster bus clock rate enabled by the invention, intra-group communication are accomplished by performing two illustrated separate bus transfers. In FIG. 4, a logical view of the high-speed synchronous multi-drop bus 110 of the computer system 100 is shown. FIG. 5 illustrates exemplary traffic flow on the high-speed synchronous multi-drop bus 110 of the computer system 100. Referring to FIG. 4, for processor P0 102 to communicate with processor P1 102, first the data is sent to the ricochet device 104 within the opposite group as indicated at a line labeled 1ST BUS TRANSFER; and then second, the data is sent back or ricocheted back to the device P1 102 for which it was originally intended indicated at a line labeled 2ND BUS TRANSFER. In FIG. 5, the two portions of the data transfer from processor P0 102 to processor P1 102 are shown in an illustrated exemplary traffic flow on the high-speed synchronous multi-drop bus 110.

In brief summary, the method of the invention allows the overall throughput of the bus 110 to increase over that which would be possible without this ricochet function. This throughput increase is due to increasing the bus clock rate beyond the limit that would have been imposed by the near-end communication delays. Even though intra-group transfers occur twice on the bus 110, this extra traffic is a minor drawback as compared to the positive aspects of being able to run the bus at a faster rate.

While the present invention has been described with reference to the details of the embodiments of the invention shown in the drawing, these details are not intended to limit the scope of the invention as claimed in the appended claims.

What is claimed is:

1. A computer system for data transfer on a high-speed synchronous multi-drop bus connected to multiple devices including at least a first group of a plurality of devices and a second group of at least one device, said computer system for transferring data between a sending device in the first group to a selected device in the first group comprising:

the plurality of devices in the first group for providing a first unidirectional data valid signal to each device in the second group;

a second each device in the second group for providing a second unidirectional data valid signal to each device in the first group;

a sending device in the first group for activating said first data valid signal and for transferring said data from said sending device in the first group to a designated device in the second group; and said designated device in the second group for activating said second data valid signal and for transferring said data from said designated device in the second group to said selected device in the first group.

2. A computer system for data transfer on a high-speed synchronous multi-drop bus as recited in claim 1 wherein the first group of a plurality of devices and the second group are spaced apart a distance greater than a distance between respective ones of the plurality of devices in the first group.

3. A computer system for data transfer on a high-speed synchronous multi-drop bus as recited in claim 1 wherein the first group of a plurality of devices include a plurality of processors, each processor connected to said high-speed synchronous multi-drop bus.

4. A computer system for data transfer on a high-speed synchronous multi-drop bus as recited in claim 1 wherein the first group of a plurality of devices include a plurality of input/output (I/O) control devices, each input/output (I/O) control device connected to said high-speed synchronous multi-drop bus.

5. A computer system for data transfer on a high-speed synchronous multi-drop bus as recited in claim 1 wherein the second group of at least one device includes a memory control and data switch device connected to said high-speed synchronous multi-drop bus.

6. A computer system for data transfer on a high-speed synchronous multi-drop bus as recited in claim 1 wherein said sending device in the first group for activating said first data valid signal and for transferring said data from said sending device in the first group to a designated device in the second group is independent of the other devices within the first group, whereby said data transfer is ignored by the other devices within the first group.

7. A computer-implemented method for data transfer on a high-speed synchronous multi-drop bus connected to multiple devices including at least a first group of a plurality of devices and a second group of at least one device, said computer-implemented method for transferring data between a sending device and a selected device in the first group comprising the steps of:

said sending device applying a first data valid signal to each device in the second group; and transferring data from said sending device in the first group to a designated device in the second group;

said designated device in the second group applying a second data valid signal to each device in the first group; and transferring said data from said designated device in the second group to said selected device in the first group.

8. A computer-implemented method for data transfer on a high-speed synchronous multi-drop bus as recited in claim 7 wherein the first group of a plurality of devices and the second group of at least one device are physically spaced apart groups of devices, and a distance between groups is greater than a distance between respective ones of the plurality of devices within the first group.

9. A computer-implemented method for data transfer on a high-speed synchronous multi-drop bus as recited in claim 7 wherein overall data transfers on said high-speed synchronous multi-drop bus includes a greater number of data transfers between said groups than between devices in the first group.

10. A computer-implemented method for data transfer on a high-speed synchronous multi-drop bus as recited in claim 7 wherein the steps of applying said first data valid signal to each device in the second group and transferring data from said sending device in the first group to said designated device in the second group are independent of the other devices within the first group, whereby the data transfer from said sending device in the first group to said designated device in the second group is ignored by the other devices within the first group.

* * * * *